United States Patent [19]

Dieterlen et al.

[11] Patent Number: 4,930,147
[45] Date of Patent: May 29, 1990

[54] CASSETTE FILM TRANSPORT

[75] Inventors: Paul E. Dieterlen, Kenton, Ky.;
Lewis B. Mustain, Cincinnati, Ohio

[73] Assignee: Liebel-Flarsheim Company,
Cincinnati, Ohio

[21] Appl. No.: 337,647

[22] Filed: Apr. 13, 1989

Related U.S. Application Data

[62] Division of Ser. No. 45,877, May 1, 1987, Pat. No. 4,845,733.

[51] Int. Cl.⁵ .............................................. G03B 42/02
[52] U.S. Cl. ..................................... 378/176; 378/181
[58] Field of Search ........................ 378/175, 176, 181

[56] References Cited

U.S. PATENT DOCUMENTS 3,832,559  8/1974  Thomas et al. ..................... 378/196

Primary Examiner—Craig E. Church
Attorney, Agent, or Firm—Wood, Herron & Evans

[57] ABSTRACT

Automatic filmer capable of centering the cassette with respect to an x-ray window and measuring the width and length thereof. Oppositely disposed channels are used to center the cassette about a first center line and measure the width thereof. A gripper assembly is used to draw the cassette into the housing and determine the length of the cassette. A carriage assembly moves the cassette within the housing so as to expose the cassette to x-rays within the x-ray window.

9 Claims, 9 Drawing Sheets

CASSETTE FILM TRANSPORT

This is a division of application Ser. No. 07/045,877, filed May 1, 1987, now U.S. Pat. No. 4,845,733.

BACKGROUND OF THE INVENTION

The present invention is directed to a method and apparatus for automatically receiving an x-ray film cassette and moving the x-ray film cassette within an x-ray apparatus for exposure.

There exists a large variety of sizes of x-ray film cassettes that are used to obtain x-ray pictures. Generally, these cassettes are substantially rectangular in shape and may be placed in one of two directions within an x-ray machine for exposure. Generally some type of mechanism is provided for placing the cassette within the x-ray window. In addition to being able to accommodate a variety of different sized and shaped cassettes, many x-ray devices of the prior art are capable of taking x-rays in the tomographic mode. With regard to x-ray machines that take x-rays in the tomographic mode it may also be necessary to provide a transport system for moving the cassette in the x-ray window. When used in the tomographic mode care must be taken so as to accurately move the cassette.

Applicant's invention provides an inproved method and apparatus for receiving and transporting an x-ray cassette within an x-ray apparatus for both fixed and tomographic x-rays.

SUMMARY OF THE INVENTION

In one aspect of the present invention there is provided an automatic x-ray cassette filmer comprising a housing having an opening therein for placement of an x-ray film cassette. The housing is provided with means for securely holding the x-ray cassette and moving the cassette either in or out of the housing. Carriage means are also provided for moving and aligning the cassette with an x-ray window.

In another aspect of the present invention there is provided a method for automatically receiving and centering an x-ray film cassette in an x-ray apparatus comprising the steps of: placing an x-ray cassette in an opening in the apparatus designed for receiving the cassette until it contacts a rear stop; centering the cassette about a first horizontal center line; centering the cassette within the housing about a second horizontal line so that it aligns the cassette with one axis of the x-ray window; moving the cassette upon receiving appropriate signal into a position in the x-ray window so as to allow exposure of the film cassette.

DETAILED DESCRIPTION OF THE DRAWINGS

Figure 1:
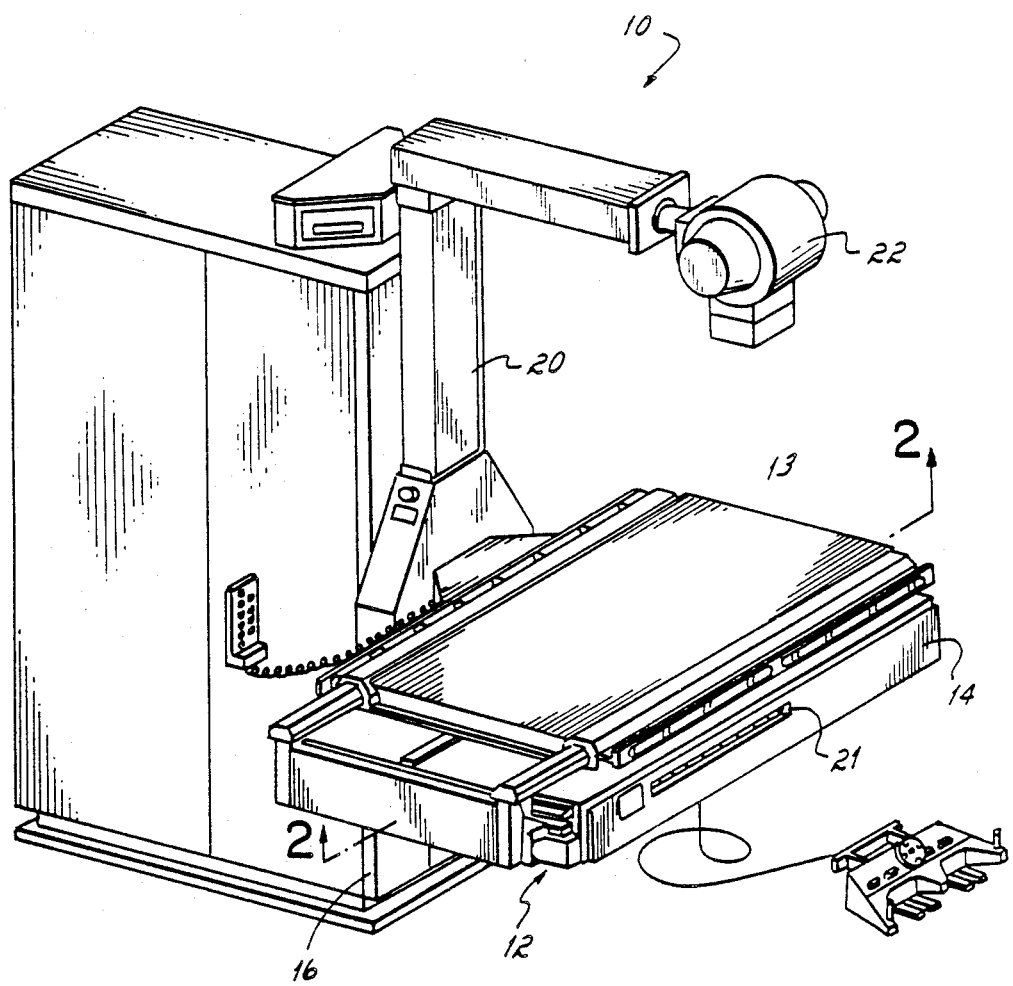
FIG. 1 is a perspective view of an apparatus for taking x-rays incorporating the automatic filmer made in accordance with the present invention.
Figure 3:
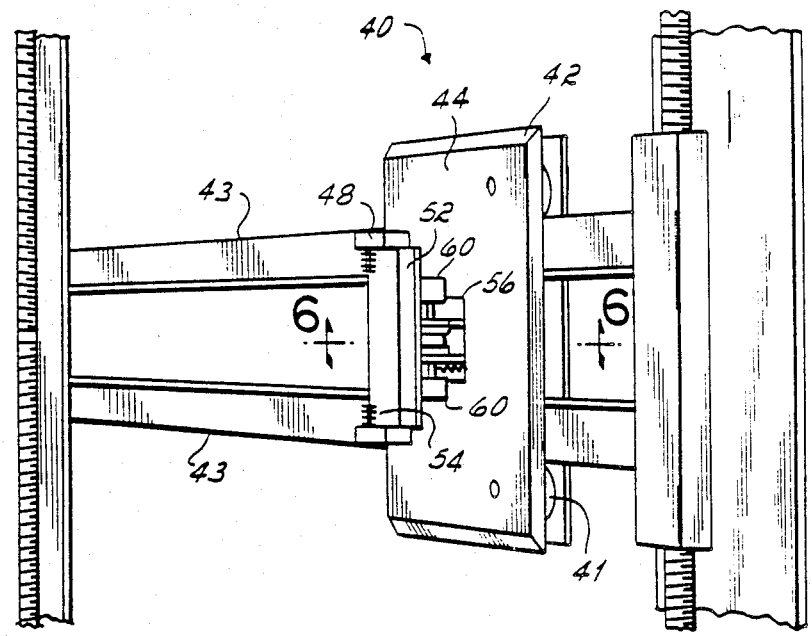
FIG. 3 is a perspective view of the gripper assembly of the automatic filmer made in accordance with the present invention.
Figure 6:
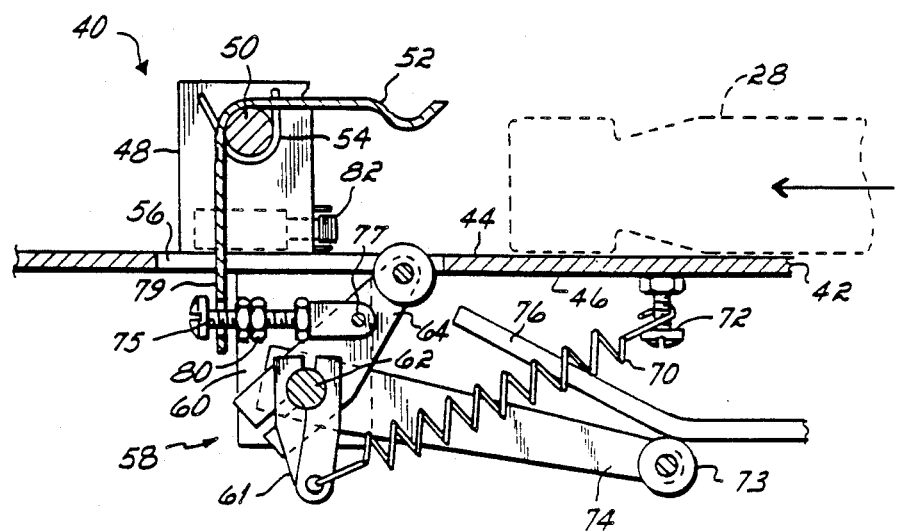
Figure 7:
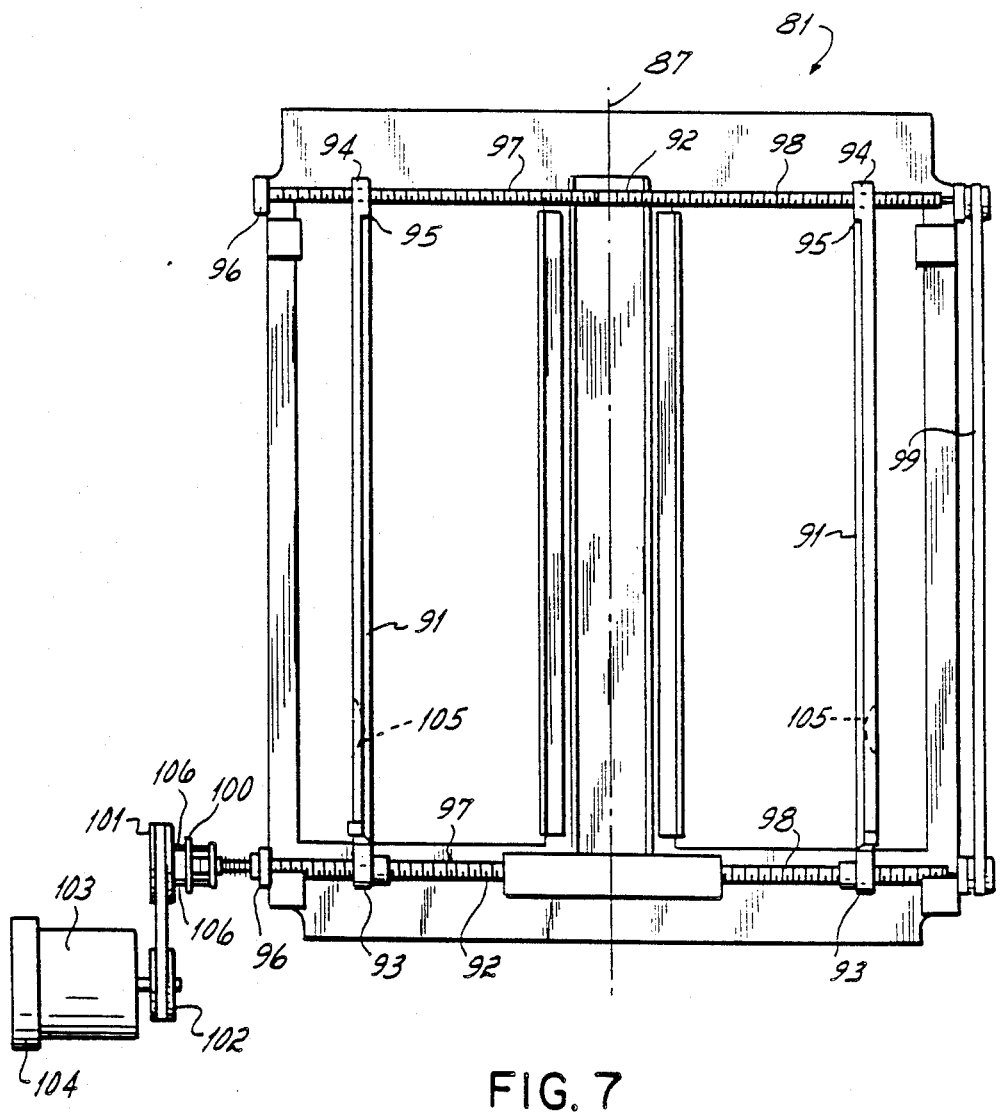
Figure 8:
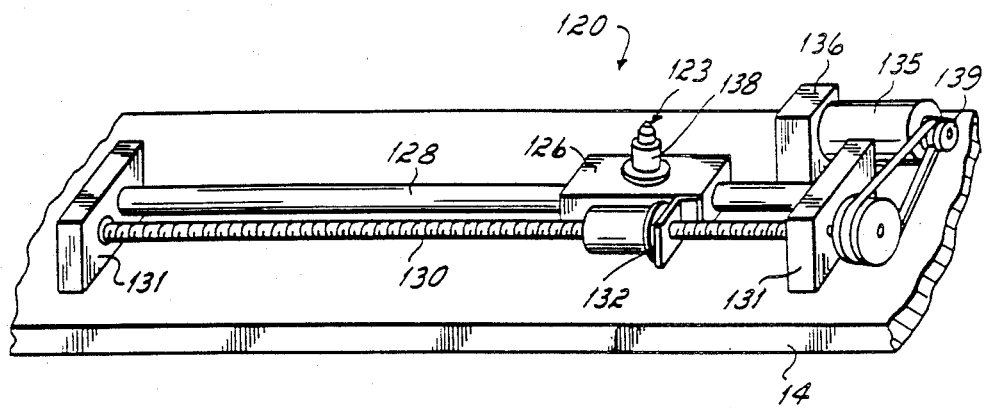
Figure 9:
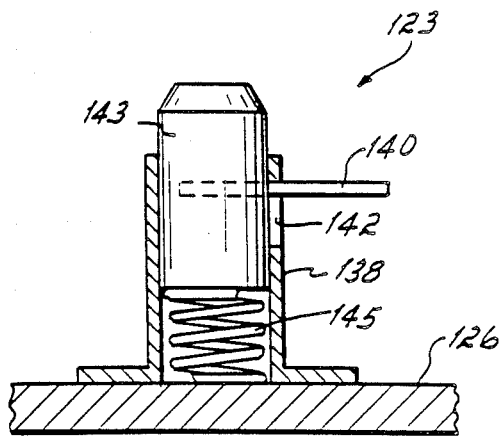

FIGS. 5 A–I illustrate in diagrammatical form the various stages of movement of an x-ray film cassette placed within the automatic filmer of FIG. 1;

FIG. 6 is a side cross-sectional view of the gripper assembly of FIG. 3 taken along line 6—6;

FIG. 7 is a top view of the channel assembly of the automatic filmer of FIG. 1 which is mounted to the carriage assembly of FIG. 3;

FIG. 8 is a perspective view of the drive mechanism used to move gripper assembly of FIG. 6; and FIG. 9 is an enlarged cross-sectional view of the drive pin of FIG. 8.

DETAILED DESCRIPTION OF THE INVENTION

Figure 2:
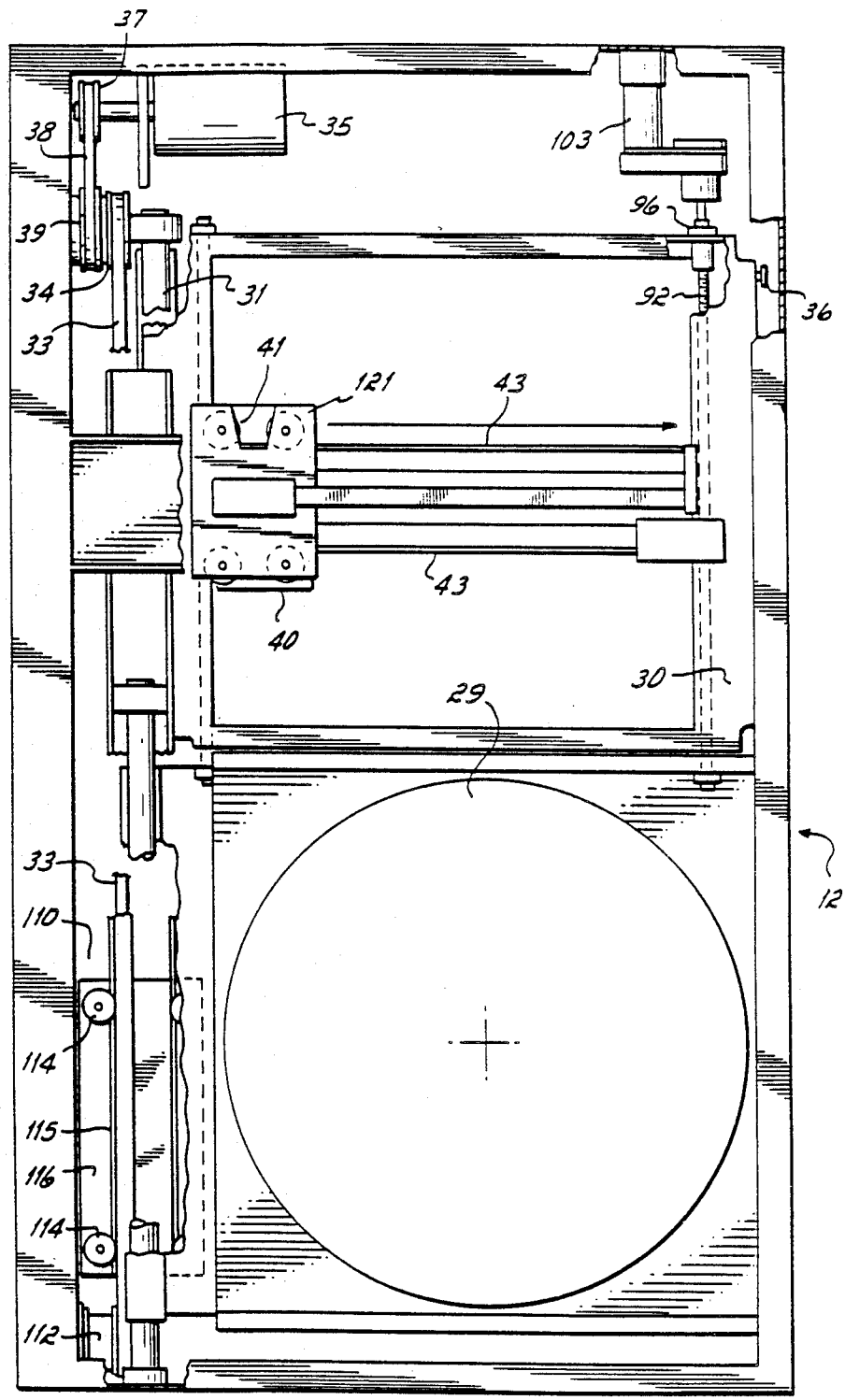
FIG. 2 is a bottom view of the automatic filmer within the housing as taken along line 2—2 of FIG. 1.

Referring to FIGS. 1 and 2 there is illustrated an x-ray apparatus 10 having automatic filmer 12 made in accordance with the present invention. The x-ray apparatus comprises a patient support surface 13 which is slidably mounted on the filmer cassette housing 14. In the particular embodiment illustrated, the filmer cassette housing 14 is pivotably mounted to the main body frame 16 rotatable shaft (not shown). In the particular embodiment illustrated the x-ray apparatus 10 is capable of providing tomographic x-rays. A rotatable tomo arm 20 is provided for moving an x-ray source 22 for operation of the apparatus in the tomographic mode. The filmer cassette housing 14 has disposed therein an automatic filmer mechanism 12 made in accordance with the present invention. The housing 14 is provided with an opening 21 for receiving or ejecting an x-ray film cassette 28 (see FIGS. 5A–I and FIG. 6). The opening, if desired, may be provided with a gate assembly (not shown) for allowing or preventing entry therein. A gate assembly such as disclosed in copending application, Ser. No. 07/044,725 filed simultaneously herewith could be employed, and such application is hereby incorporated herein.

The automatic filmer 12 is provided with a carriage assembly 30 which is mounted within the housing 14 so that it can be moved in the axial direction for placement of a film cassette 28 within the x-ray window 29. In the particular embodiment illustrated one side of carriage assembly 30 is slidably secured to a guide rod 31. The carriage assembly 30 is driven along guide rod 31 by timing belt 33 attached thereto. The belt 33 is wrapped around drive pulley 34 which is driven by a motor 35 through pulley 37 connected to motor 35, belt 38 on pulley 37 and pulley 39 which is directly connected to pulley 34. The opposite side of carriage assembly 30 has a pair of rollers 36 which ride on housing 14. By rotating pulley 34 in the appropriate direction carriage assembly 30 is moved toward or away from x-ray window 29. The x-ray cassette 28 may occupy a stationary position in the x-ray window or be moved within the x-ray window so as to provide tomograhic x-rays.

When an x-ray film cassette 28 is placed through opening 21 it engages a gripper assembly 40 (see FIG. 4) which is slidably mounted on carrige assembly 30. In the particular embodiment illustrated, gripper assembly is provided with rollers 41 which roll along linear guide rails 43 of carriage assembly 30.

Referring to FIG. 6 there is illustrated a cross-sectional side view of the gripper assembly 40. The gripper assembly 40 includes a base plate 42 having an upper surface 44 and lower surface 46. Secured to upper surface 44 of plate 42 is a bearing block 48 having supporting pin 50 pivotably affixed thereto. An upper jaw 52 is mounted to pin 50. A torsion spring 54 biases the upper jaw 52 downward toward plate 42. The other end of the upper jaw 52 extends through an opening 56 in plate 42 and is connected to lower jaw assembly 58 which is securely attached to lower surface 46 of plate 42 by lower bearing block 60. Lower bearing block 60 includes a pin 62 which is capable of being rotated therein. A lower jaw 64 is attached to pin 62 so that lower jaw 64 will rotate as pin 62 is rotated. Lower jaw 64 is normally biased toward the upper jaw 52 by spring means 70. Spring means 70 comprises a coil spring which is connected to plate 42 at one end and the other end is attached to pin 62 by connecting member 61. Connecting member 61 is attached to pin 62 so that it rotates as pin 62 is rotated. The spring 70 is affixed to the plate 42 by attachment means 72. In the particular embodiment illustrated the attachment means 72 is a screw which threadedly engages lower surface 46 of plate 42. A cam follower 73 is affixed to lower arm 74 in such a manner that pin 62 rotates about its axis as roller follower 73 is forced down cam ramp 76. A push/pull rod 75 is pivotably connected to lower jaw 64 by pin 77. The other end of push/pull rod 75 is connected to lower end 79 of upper jaw 52 by adjustable screw means 80. A cam ramp 76 is attached to the carriage assembly 30 (not shown in FIG. 6).

FIG. 6 illustrates the gripper assembly 40 in the receiving position. In this position the roller follower 74 has been forced down cam ramp 76 so as to cause the lower jaw 64 to be moved away from plate 42 and the upper jaw 52 caused to move away from the lower jaw by adjustble push/pull rod 75. Push/pull rod 75 is adjusted so that it will move upper jaw 52 away from plate 42 as cam follower 73 rides down cam ramp 76 and moves upper jaw 52 toward plate 42 as it rides up cam ramp 76. Accordingly, as gripper assembly 40 moves away from its receiving position the roller 74 will ride up ramp 76 thereby allowing the upper jaw 52 and lower jaw 64 to firmly grip the end of the cassette. The cassette 28 is illustrated in the dashed lines. As the cassette 28 is pushed in engagement with the upper bearing block 48 a switch 82 disposed within bearing block 48 is depressed thereby causing activation of a drive means which causes gripper assembly to move away from cam ramp 76. As the roller follower 74 rides up cam ramp 76 the lower jaw and upper jaw 52, 64 respectively begin to securely hold the cassette 46 therebetween. Likewise, when the gripper assembly is brought into receiving position roller 73 will ride down ramp 76 thereby causing the upper jaw and lower jaw to release the cassette therefrom.

Figure 5A:
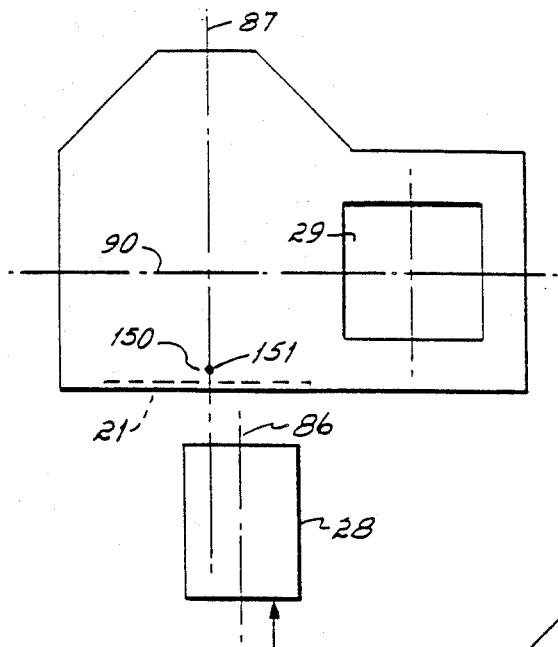
Figure 5B:
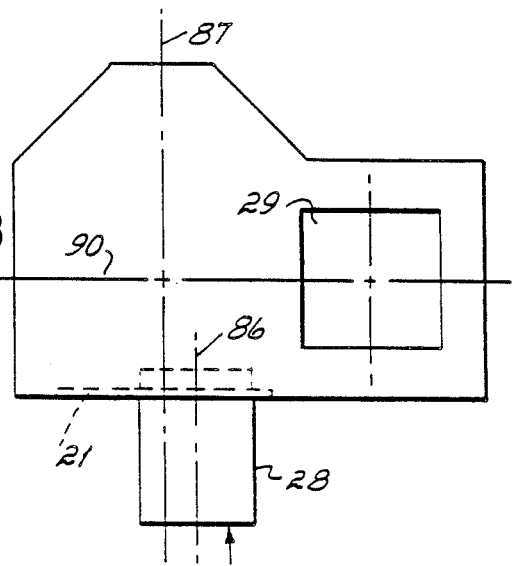
Figure 5C:
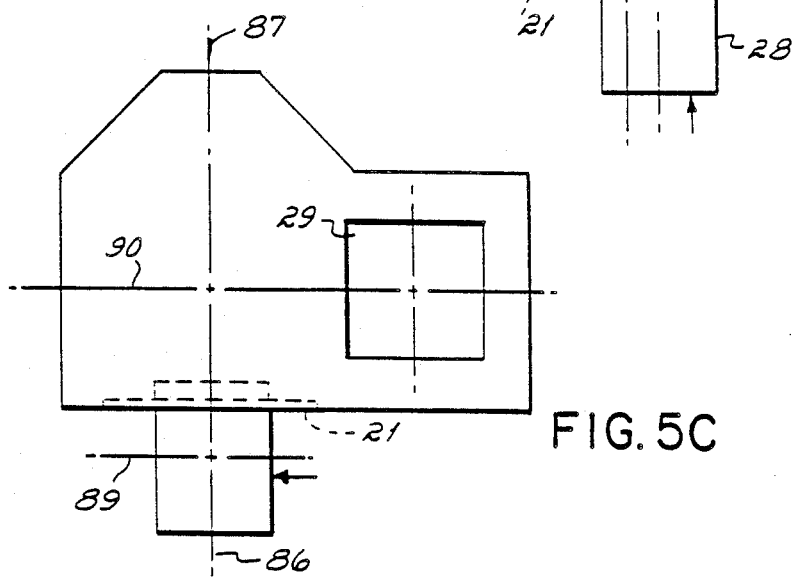
Figure 5D:
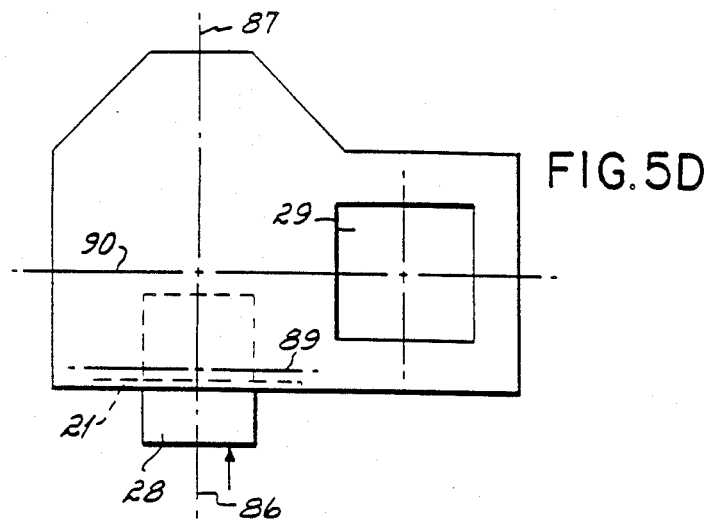

Referring to FIGS. 5A-5I there is diagrammatically illustrated the steps in which the cassette is received in housing 14 and transferred to the x-ray window 29 and then ejected from the housing 14. FIG. 5A illustrates an x-ray film cassette 28 about to be passed through opening 21 in housing 14. The x-ray cassette 28 is passed through an optional gate assembly (not shown) in either one two orientations. This breaks a scanner beam and locks out all electronics not involved with the movement of the cassette 28. The cassette 28 is passed through opening 21 until it contacts bearing block 48. At this point motor-driven guide channels which form a part of the carriage assembly 30 converge on the cassette 28 from both sides (see FIG. 5C) so that the vertical center line 86 of the cassette 28 aligns center line 87 of opening 21.

Referring to FIG. 7 there is illustrated a channel assembly 81 used to center the cassette along center line 87 of channel assembly 81. The channel assembly 81 comprises a pair of substantially "C" shaped channels 91. The open end of each channel 91 faces toward the center line 87. The channels 91 are supported by threaded screws 92, one at each end of channel 91. The channels 91 each have a nut 93 at the leading end attached rigidly to and below the channel 91 to allow the cassette to slide into the channel, while the nut 94 (shown in dash lines) on the trailing end 95 of channel 91 is confined by the channel and allowed to float to minimize alignment problems. The screws 92 are supported by self aligning bearings 96 secured to carriage assembly 30. Self aligning bearings 96 allow the screws 92 to turn freely in spite of any inaccuracies in forming of the carriage assembly to which the bearings are attached. The left side 97 of screws 92 are provided with left handed threads while the right side 98 are provided with right handed threads so that the channels 91 may be moved toward or away from each other by rotating the screws. The screws 92 are linked together by a cable chain 99 so that they turn in a 1:1 ratio. Screw 92 has a drive coupling 100 which engages a pulley 101 which is driven by drive channel pulley 102 driven by a drive motor 103. Drive motor 103 may turn in either direction and has an encoder 104 attached thereto which counts the revolutions of the motor. This information is related to the microprocessor and is used to determined the position of channels 91. Accordingly, the width of the cassette can be readily calculated by the microprocessor. A microswitch 105 is disposed within each channel 91 to sense when a cassette is present.

When a cassette 28 is inserted into gripper assembly 40 a signal is given to start the channel drive motor 103. The channels 91 advance toward the cassette 28 on both sides at equal speed, causing the center line of the cassette to move toward the center line 87 of the channel assembly 81, regardless of the size of the cassette 28. When a signal is received from both of the two limit switches 105 built into the channels, indicating that both channels have contacted cassette 28, which is now centered, channel drive motor 103 will stop. The channel drive motor 103 will reverse briefly to withdraw the channels 91 from the cassette 28 tightly. The gripper assembly 40 then draws the cassette 28 into the housing by sliding it between channels 91 which act as guide surfaces, until the cassette is centered on the longitudinal center line 90.

The drive assembly consisting of motor 103, encoder 104, pulleys 102 and 101 is attached securely to housing 14 and does not move with carriage assembly 30 when this carriage transports the x-ray cassette to the filming position. The drive coupling 100 has a pair of drive pins 106 which disengage from drive slots in pulley 101 when carriage assembly 30 moves to the filming positon. These pins are spring biased so in the event that the pins 106 of drive coupling 100 do not align wih the drive slots in pulley 101 when the carriage assembly returns to the home position, the pins will nevertheless snap into the appropriate holes in pulley 101 when this pulley is turned by the channel drive motor 103.

Figure 5E:
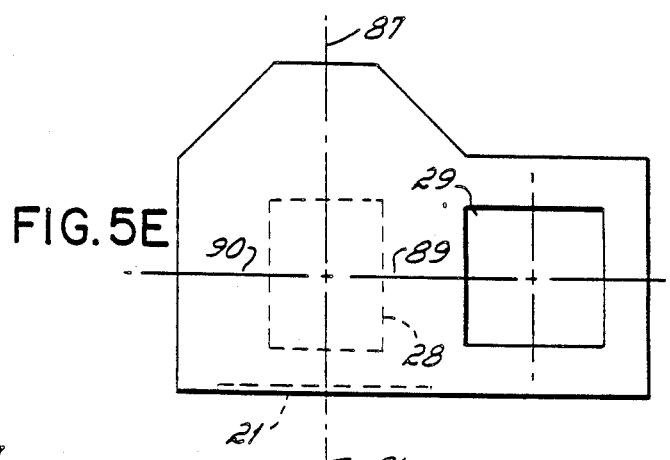
Figure 5F:
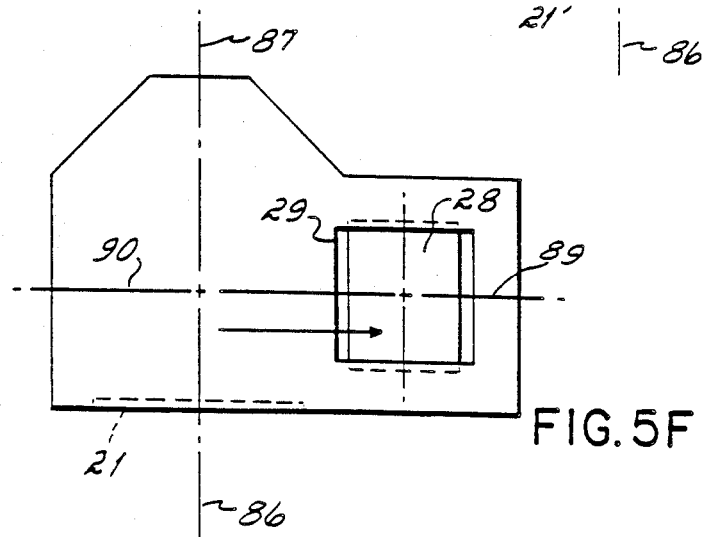
Figure 5G:
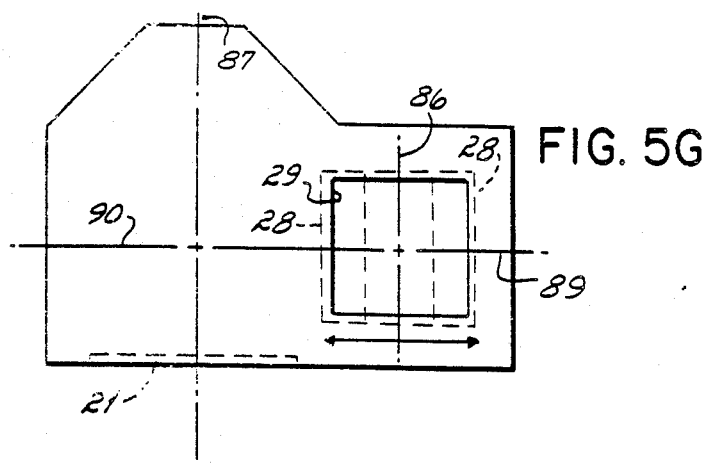
Figure 5H:
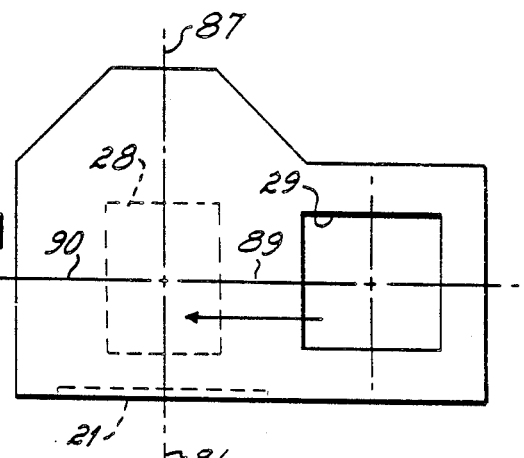
Figure 5I:
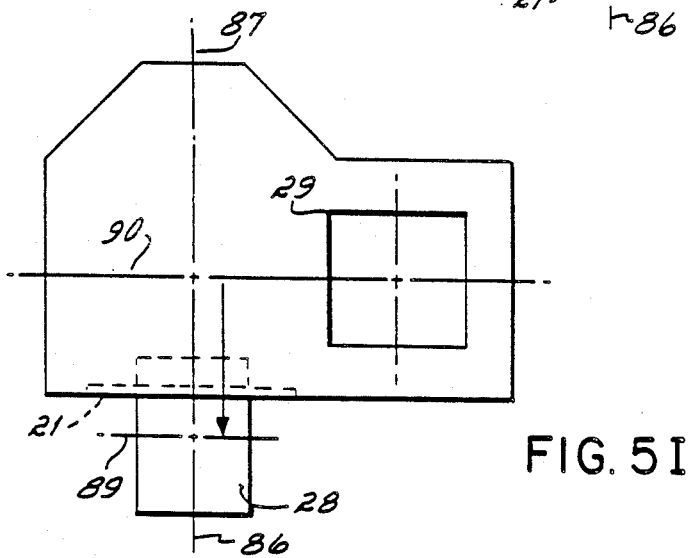

After the center line 86 (channel drive) of cassette 28 has been aligned with center line 87 of channel assembly 81, the cassette 28 is drawn within the housing 14. The operator continues to hold pressure against the cassette 28 until the cassette 28 begins to be automatically drawn into the housing (see FIGS. 5C and 5D). The operator may release the cassette when the gripper assembly 40 has firmly clamped the cassette 28 between upper jaw 52 and lower jaw 64. Cassette 28 will continue to be drawn into the housing 14 until the cassette's longitudinal center line 89 is aligned with the longitudinal center line 90 of the x-ray window 29 (see FIGS. 5D and 5E). FIG. 5E illustrates the "home" position. Upon receiving a signal from the operator, the cassette 28 will move rapidly to a position centered at the x-ray window 29 (FIG. 5F) at which point an x-ray picture may be taken. If so desired, the cassette 28 may be moved in synchronism with a tomographic arm (FIG. 5G) in order in take a tomographic x-ray picture as is more fully described in copending application, Ser. No. 07/044,643 which was filed simultaneously with this application and is hereby incorporated by reference. Upon receiving a signal that the x-ray film has been exposed, the cassette 28 returns to the home position illustrated in FIG. 5H. After reaching the home position the cassette 28 is automatically ejected from the housing 14 and stops at a position from which it can be removed by the operator (FIG. 5I).

Referring back to FIG. 2, a counterweight carriage assembly 110 is mounted to move in linear relation to the filmer housing 14 by means of rollers 114 which roll along linear guide rails 115 attached to housing 14. The counterweight carriage assembly is linked to the filmer carriage assembly 30 by timing belt 33. The counterweight carriage assembly 110 includes a pulley 112 mounted to housing 14 around which timing belt 33 is placed. The other end of timing belt 33 is driven by pulley 34 which also drives carriage assembly 30. A counterweight 116 of appropriate weight is incorporated into the carriage 110, which is attached to timing belt 33 so that it moves in the opposite direction from which carriage assembly 30 moves. Counterweight carriage assembly 110 reduces the power required to move the carriage assembly 30 when the patient support surface 13 is disposed in the substantially vertical position. The counterweight carriage assembly 110 also assists in smoothing out the movement of carriage assembly 30 for all positions of the patient support surface 13.

Figure 4:
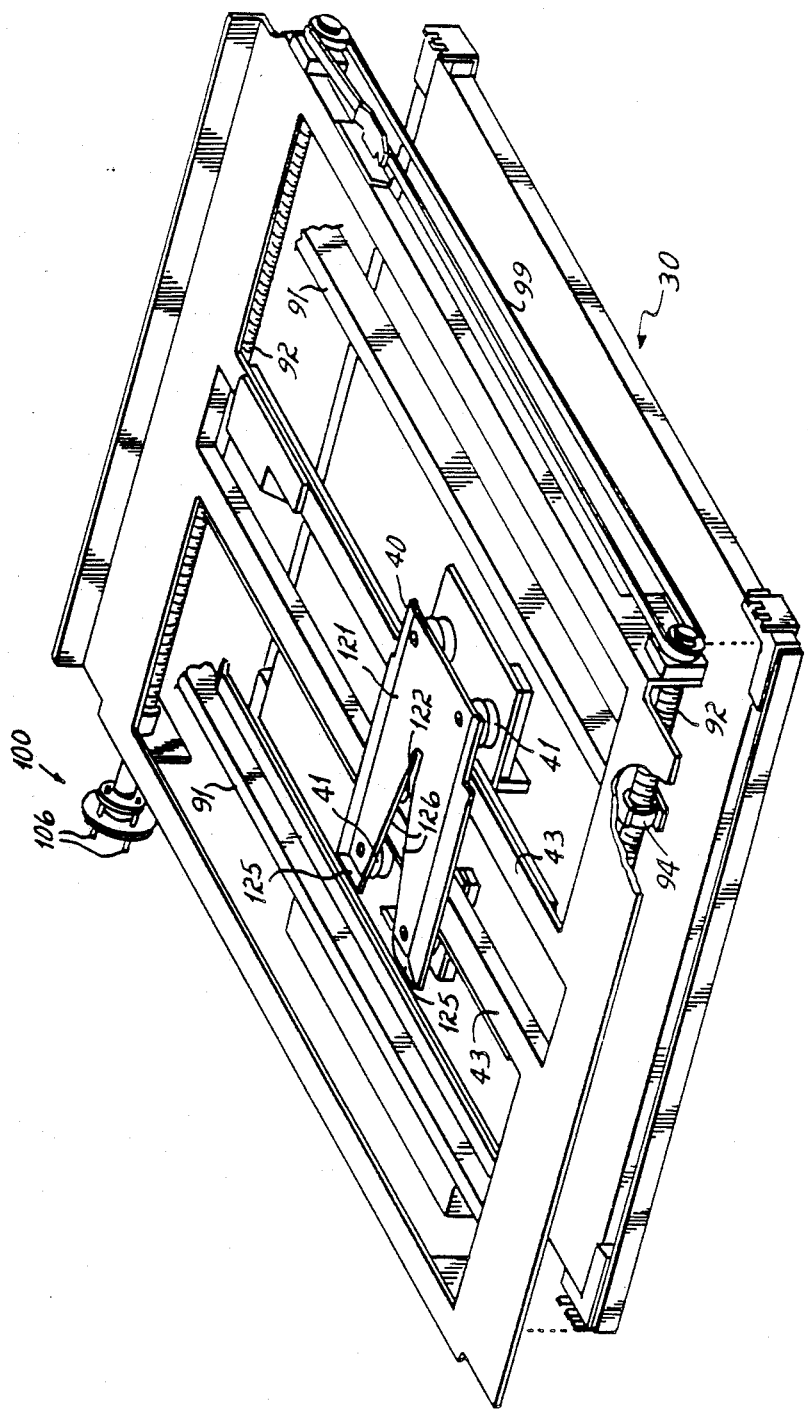
FIG. 4 is a bottom perspective view of the carriage assembly which carries the gripper assembly of FIG. 3.

Referring to FIGS. 4 and 8, there is illustrated the drive mechanism 120 for moving the gripper assembly 40. Drive mechanism 120 is located within housing 14 below the home position of carriage assembly 30. The mounting of drive mechanism 120 is totally independent of gripper assembly 40 and carriage assembly 30. On the bottom side of gripper assembly 40 (see FIG. 4) there is provided a drive plate 121 which has a drive slot 122. When the carriage assembly is in the home position drive slot 122 engages a spring loaded drive pin 123. Drive pin 123 is the means by which gripper assembly 40 is moved, causing cassette 28 to be drawn into or out of the housing 14. When carriage assembly 30 moves to the position within the x-ray window in order for an x-ray picture to be received, drive plate 121 disengages from drive pin 123. This eliminates the need for the drive unit for the gripper assembly to move with carriage 40. The drive slot 122 has angled edges 126 that get wider as they approach outer peripheral edge 125 of the drive plate to make reengagement of the drive plate 121 with the pin 123 when the carriage 30 returns to the home position less critical.

The drive pin 123 is mounted to a drive block 126 which is slidably mounted on guide rod 128. A drive screw 130 is securely attached by bearings to mounting blocks 131 at its ends which are secured to housing 14. The drive screw 130 is connected to the drive block 126 by drive nut 132. As the drive screw 130 is rotated, it causes the drive nut 132 to move along the drive screw 130 and thus moves the drive pin 123 along the axis of the guide rod 128. The drive screw 130 is appropriately turned by a drive motor 135 by belt 137 and pulleys 139, 141. An encoder 136 attached to motor 135 for determining the position of the drive pin 123 along drive screw 130. The encoder 136 counts the number of revolutions of the motor and thereby translates this to the position of the drive pin 123 along the guide rod 128.

Referring to FIG. 9 there is shown an enlarged cross-sectional view of the drive pin 123 of FIG. 8. The drive pin 123 comprises a plastic pin 143 which may slide up and down in pin housing 138. The travel of the pin 143 is limited by a limiting pin 140 which extends through slot 142 in housing 138. The limiting pin 140 limits the vertical movement of the drive pin 123. A spring 145 is disposed beneath the drive pin 123 which forces it upward so it is normally positioned at the upper limit of its travel range. The top of the drive pin is beveled so it meshes smoothly with the angled edges 126 of the drive plate 121. The drive motor 135 controls the position of the drive pin 123, which in turn controls the position of the gripper assembly 40. The encoder 136 built into the small motor 135 allows the position of the gripper assembly 40 to be determined at all times. Thus the position of the leading edge of cassette 28 is also known. Sensing means is also provided for determining the trailing edge of cassette 28. In the particular embodiment illustrated a light source 151 (see FIG. 5A) is positioned within housing 14 behind opening 21, preferably in line with center line 87. The sensor 150 senses when the trailing edge of the cassette 28 has passed. This information along with the information from encoder 136 is used in centering the cassette and determining its size for the purpose of adjusting x-ray image size.

Should pin 123 ever become disengaged in the home position, the pin 123 travels toward the gripper assembly 40 until it strikes the angled peripheral edges 125 of the drive plate 121 which causes drive pin 123 to ride down in housing 138, and because it is spring loaded it will reengage slot 122.

It is to be understood that various changes and modifications may be made without departing from the scope of the present invention.

What is claimed is:

1. An x-ray film apparatus comprising:
   a housing;
   movable carriage means within said housing and movable relative said housing along a first path for moving an x-ray film cassette between a loading station and an x-ray station;
   first drive means coupled to said carriage means for driving said carriage means between said stations;
   cassette loading means attached to said movable carriage means for moving the cassette along a second path into and out of said carriage meas;
   second drive means at said loading station for driving said cassette loading means whereby to move the cassette; and
   interconnect means for selectively, physically connecting and disconnecting said second drive means to and from said cassette loading means, said second drive means being physically connected to said cassette loading means when said carriage means is at said loading station, said second drive means being physically disconnected from said cassette loading means when said carriage means is spaced away from said loading station.

2. The apparatus of claim 1, said interconnect means including:
- a movable drive pin associated with said second drive means; and
- a drive plate associated with said cassette loading means, said drive plate including slot means for selectively engaging said drive pin wherein to move said drive plate with said drive pin, said drive pin being engaged by said slot when said carriage means is at said loading station, and said drive pin being disengaged from said slot means when said carriage means is spaced away from said loading station.

3. The apparatus of claim 1 further comprising:
- movable guide means coupled to said carriage means and defining a variable-width cassette receiving area;
- third drive means for moving said guide means into engagement with a cassette placed along said second path; and
- second interconnect means for selectively, physically connecting and disconnecting said third drive means to and from said movable guide means, said third drive means being physically connected to said movable guide means when said carriage means is at said loading station, said third drive means being physically disconnected from said movable guide means when said carriage means is spaced away from said loading station.

4. The apparatus of claim 3, said second interconnect means including:
- a drive pin coupled to said movable guide means; and
- a rotating member coupled to said third drive means, said rotating member having a drive slot rotatable therewith to selectively receive said drive pin therein and for rotation therewith.

5. The apparatus of claim 1, said second drive means being attached to said housing.

6. An x-ray film apparatus comprising:
- movable carriage means movable along a first path for moving an x-ray film cassette between a loading station and an x-ray station;
- first drive means coupled to said carriage means for driving said carriage means between said stations;
- cassette loading means for moving the cassette along a second path into and out of said carriage means;
- second drive means for driving said cassette loading means whereby to move the cassette;
- a movable drive pin associated with said second drive means; and
- a drive plate associated with said cassette loading means, said drive plate including slot means for selectively engaging said drive pin wherein to move said drive plate with said drive pin, said drive pin being engaged by said slot when said cassette loading means is at said loading station, and said drive pin being disengaged from said slot means when said cassette loading means is spaced away from said loading station.

7. An x-ray film apparatus comprising:
- movable carriage means movable along a first path for moving an x-ray film cassette between a loading station and an x-ray station;
- first drive means coupled to said carriage means for driving said carriage means between said stations;
- cassette loading means attached to and movable with the movable carriage means for moving the cassette along a second path into and out of said carriage means;
- second drive means for driving said cassette loading means whereby to move the cassette;
- movable guide means coupled to said carriage means and defining a variable-width cassette receiving area;
- third drive means for moving said guide means into engagement with a cassette placed along said second path; and
- interconnect means for selectively, physically connecting and disconnecting said third drive means to and from said movable guide means, said third drive means being physically connected to said movable guide means when said carriage is at said loading station, said third drive means being physically disconnected from said movable guide means when said carriage is spaced away from said loading station.

8. The apparatus of claim 7, said interconnect means including:
- a drive pin coupled to said movable guide means; and
- a rotating member coupled to said third drive means, said rotating member having a drive slot rotatable therewith to selectively receive said drive pin therein and for rotation therewith.

9. The apparatus of claim 7 further comprising:
- second interconnect means for selectively, physically connecting and disconnecting said second drive means to and from said cassette loading means, said second drive means being physically connected to said cassette loading means when said carriage is at said loading station, said second drive means being physically disconnected from said cassette loading means when said carriage is spaced away from said loading station.

* * * * *

UNITED STATES PATENT AND TRADEMARK OFFICE
CERTIFICATE OF CORRECTION

PATENT NO.   :   4,930,147
DATED        :   May 29, 1990
INVENTOR(S)  :   Paul E. Dieterlen and Lewis B. Mustain It is certified that error appears in the above-identified patent and that said Letters Patent is hereby corrected as shown below:

Col. 2, line 20, after "16", insert -- by --.

Col. 3, line 29, "adjustble" should be -- adjustable --.

Col. 6, line 56, "meas" should be -- means --.

Signed and Sealed this

Fourteenth Day of May, 1991

*Attest:*

HARRY F. MANBECK, JR.

*Attesting Officer*          *Commissioner of Patents and Trademarks*